Patented Jan. 21, 1947

2,414,564

UNITED STATES PATENT OFFICE 2,414,564

PORTABLE WELDING FUME EXHAUSTER

Leslie Silverman, Westwood, and Frederick J. Viles, Jr., Boston, Mass.

Application April 17, 1945, Serial No. 588,872

10 Claims. (Cl. 183—37)

This invention relates to welding fume exhausters, and more particularly to portable exhausters.

During welding, fumes are given off which are harmful and obnoxious. These fumes include iron oxide fume and zinc oxide fume. In order to remove welding fume from the air it is common practice to draw it away from the welding job through a suction hose connected to large, heavy suction apparatus more or less permanently located in one place. Such exhausters are satisfactory where the welding requires a long time in one location and where there is plenty of space in which the welder can work. On the other hand, where the welding consists of many short jobs scattered around, such as repair work, and thus requires frequent moving about, or when welding is done in small confined spaces, particularly those not easily accessible, the exhausters known heretofore are not very satisfactory.

It is among the objects of this invention to provide a welding fume exhauster which is light and compact so that it can be carried about by a welder, which is small enough to be taken into confined spaces, which is simple in construction and operation, which is highly efficient, and in which the filtering means can readily be cleaned.

In accordance with this invention a portable housing has inlet and outlet ports in its opposite ends, and a flexible hose is connected to the inlet and extends away from the housing to the welding location. An exhaust fan is carried by the housing adjacent its outlet for drawing welding fume through the hose and into the housing. Inside the housing there are one or more filter bags disposed in the path of flow of fume through the housing, and they have their open ends facing the inlet end of the housing. The opposite ends of the bags are connected to bag-shaking means that extends outside of the housing so that the particulate matter filtered from the fume can be shaken out of the bags to clean them. The closed ends of the bags may be urged toward their open ends by a spring, but the bags normally are held in extended position by a retaining member connected to the bag-shaking means outside of the housing. Disposed between the bags and the housing inlet is a spark arrestor. The spark arrestor and the bags empty into chambers that are provided with normally closed clean-out openings. Also, between the spark arrestor and the housing inlet there is a separating chamber containing a curved baffle member against which the incoming particles in the fume impinge, whereby slag and some of the fume particles settle out of the fume stream and do not reach the filter unit.

Figure 1:
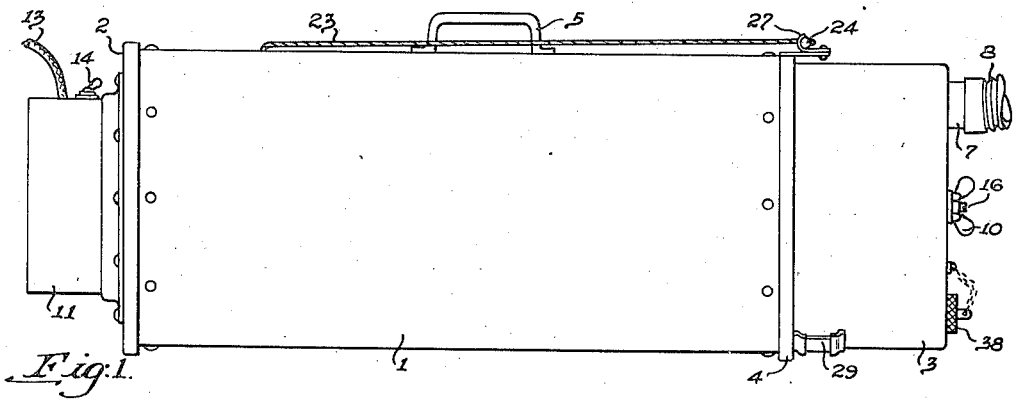
Figure 2:
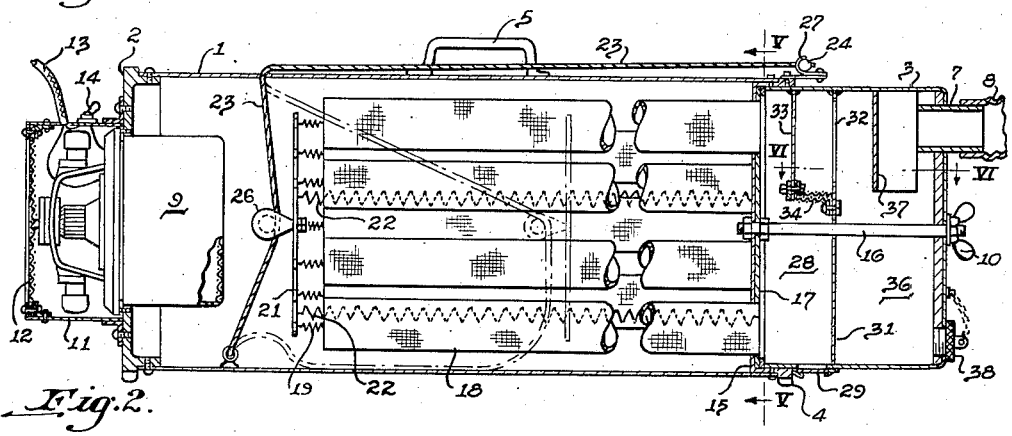
Figure 3:
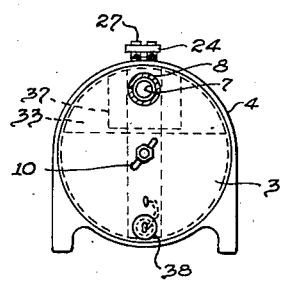
Figure 4:
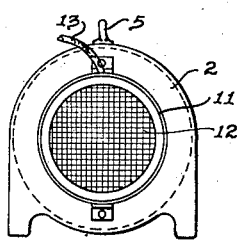
Figure 5:
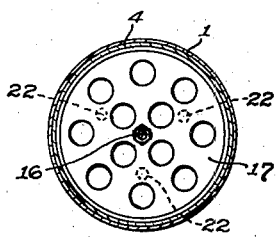
Figure 6:
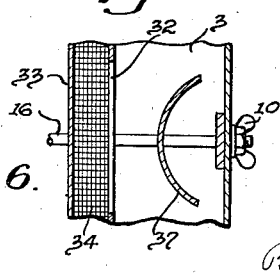

The preferred embodiment of the invention is illustrated in the accompanying drawing in which Fig. 1 is a side view of our fume exhauster; Fig. 2 is a vertical longitudinal section; Fig. 3 is a reduced view of the front end; Fig. 4 is a view of the rear end; Fig. 5 is a transverse section taken on the line V—V of Fig. 2; and Fig. 6 is a fragmentary horizontal section taken on the line VI—VI of Fig. 2.

Referring to Figs. 1 to 4 of the drawing, a portable cylindrical housing is formed from a horizontal cylinder 1 the rear end of which is closed by a cap 2 and the front end of which is closed by a hollow head 3 projecting therefrom. The rear of the head fits in a heavy ring 4 projecting from inside the cylinder to which it is attached. The central part of the cylinder is provided with a handle 5 so that the housing can be carried about. The front wall of the hollow head is provided near its top with an inlet port in which a short tube 7 is rigidly mounted. The rear end of a flexible hose 8 is mounted on this tube, the front end of the hose being adapted to be positioned beside work being welded. The cap 2 at the rear end of the housing is provided with a central opening in which an electric suction fan unit 9 is mounted. The motor end of this unit projects from the cap and is encircled by a shield 11 the rear end of which is covered by a protective screen 12. An electric cord 13, for connecting the fan to an electric outlet, extends through the shield on which an electric switch 14 is mounted for controlling the fan. This fan creates a suction in the housing and thereby draws welding fume into the free end of the hose.

Rigidly mounted in the front end of cylinder 1 directly behind the open rear end of head 3 is a circular plate 15, as shown in Fig. 2, integral with ring 4 and provided with a number of round holes. A long bolt 16 is rigidly mounted in the center of this plate and extends forward through a hole in the center of the front wall of the head. A wing nut 10 threaded on this bolt holds the head on the end of the cylinder. Engaging the front of plate 15 is a circular piece of fabric 17 (Fig. 5) likewise provided with round holes registering with those in the plate. A plurality of long tube-like bags 18, made of filter cloth, are disposed in cylinder 1 behind the perforated plate through the holes in which the open front ends of the bags extend for permanent attachment to fabric 17 around the holes therein. The closed rear ends of the bags are connected by short coil springs 19 to a supporting perforated disc 21 that is movable lengthwise of the cylinder. This disc is urged toward plate 15 by three equally spaced long coil springs 22 which connect them, thus tending to compress or collapse the filter bags lengthwise. However, the movable disc normally is held near the rear end of the cylinder in order to extend the bags their full length. This is accomplished by means of a flexible pull line 23 having its inner end attached to the inside of the cylinder near the fan. The line extends across the cylinder and out through a hole in the opposite side, and its outer end is provided with a pull handle 24. Inside the cylinder the line extends through a pulley 26 projecting from the back of disc 21.

When the line is pulled out of the cylinder as far as possible its handle can be gripped by a bifurcated hook 27 mounted on ring 4. This holds the line in its outermost position and thereby holds the movable disc 21 in its rear position with the filter bags fully extended. The pulley connection with the line permits the disc to be pulled straight back in the cylinder. The springs attached to the disc allow the line to be pulled out of the cylinder far enough to be attached to hook 27, and then they take up the small amount of slack in the line and keep the bags taut. When the line is released from the hook, springs 22 pull the movable disc toward plate 15 to the dotted line position shown in Fig. 2. By jerking the line the disc can be reciprocated in the cylinder to shake the bags, so that when the housing is standing on its front end the dust collected by the filter bags will be shaken out of them and into a chamber 28 formed in the rear end of the hollow head. The bottom wall of this chamber is provided with a clean-out opening that normally is closed by a slide 29 which can be removed in order to empty the chamber of the particulate matter that has been shaken into it from the bags.

The front wall of chamber 28 is formed by a partition member 31 provided behind the inlet port with an opening 32. A short distance behind this opening there is a deflecting plate 33 the lower edge of which is connected to the partition member by a pair of horizontal screens 34 accessible for cleaning when head 3 is removed. The screened passage thus formed through the partition constitutes a spark arrestor for catching any sparks that may be sucked into the housing before they can enter the filter bags and set them on fire.

In the chamber 36 in front of partition 31 slag and large particles are separated from the fume stream. Some of this separation occurs by settling due to the sudden decrease in air velocity as it enters the large settling chamber from the hose. The rest of the separation is accomplished by placing a baffle 37 between the inlet port and the spark arrestor. The incoming fume strikes the central area of this baffle and then flows outwardly around its free edges and then back through the spark arrestor. In doing this heavy particles drop out of the stream and fall into the bottom of the settling chamber from which they can be removed through a clean-out opening normally closed by a screw plug 38. As shown in Fig. 6, the baffle preferably is curved laterally with its opposite sides extending forward. The fume stream impinges against the central area of the baffle and then divides and flows laterally in opposite directions in curved paths back toward the front of the head. The centrifugal action thus imparted to the particles in the fume causes the heavier ones to be thrown outwardly against the baffle down which they fall into the separating chamber.

This welding fume exhauster is very practical on short jobs and where welders frequently change their working locations. There is no danger of the hose not being long enough because this exhauster can be carried close to the job and into confined areas. This unit also materially reduces the tripping hazard that is present when a conventional long, large sucker tube is used. As the exhauster almost entirely removes welding fume from the air, the air discharged by the fan can be recirculated.

According to the provisions of the patent statutes, we have explained the principle and construction of our invention and have illustrated and described what we now consider to represent its best embodiment. However, we desire to have it understood that, within the scope of the appended claims, the invention may be practiced otherwise than as specifically illustrated and described.

We claim:

1. A welding fume exhauster comprising a portable housing provided in its opposite ends with inlet and outlet ports, a flexible hose outside the housing connected to said inlet, an exhaust fan carried by the housing adjacent its outlet for drawing welding fume into said hose, a filter bag in the housing in the path of said fume, means urging the bag to collapsed position and means operable from outside the housing for extending and shaking the bag, the housing being provided with a normally closed clean-out opening adjacent the open end of said bag.

2. A welding fume exhauster comprising a portable housing provided in its opposite ends with inlet and outlet ports, a flexible hose outside the housing connected to said inlet, an exhaust fan carried by the housing adjacent its outlet for drawing welding fume into said hose, a filter bag in the housing in the path of said fume, means for holding the open end of the bag in fixed position, a flexible pull line connected to the opposite end of the bag and extending slidably through the wall of said housing for shaking the bag, a spring urging said opposite end of the bag toward its open end to collapse the bag, and means for holding the line in its outermost position to extend the bag, the housing being provided with a normally closed clean-out opening adjacent the open end of said bag.

3. A welding fume exhauster comprising a portable housing provided in its opposite ends with inlet and outlet ports, a flexible hose outside the housing connected to said inlet, an exhaust fan carried by the housing adjacent its outlet for drawing welding fume into said hose, a filter bag in the housing in the path of said fume, means holding the open end of the bag in fixed position, a supporting member connected to the opposite end of the bag, a coil spring connecting said member to said holding means, a flexible line connected to said member for pulling it to extend the bag, said line extending out of the housing, and means for holding the line in its bag-extending position, the housing being provided with a normally closed clean-out opening adjacent the open end of said bag.

4. A welding fume exhauster comprising a portable housing provided in its opposite ends with inlet and outlet ports, a flexible hose outside the housing connected to said inlet, an exhaust fan carried by the housing adjacent its outlet for drawing welding fume into said hose, a filter bag in the housing in the path of said fume, means holding the open end of the bag in fixed position, a supporting member connected to the opposite end of the bag, a coil spring connecting said member to said holding means, a flexible pull line rigidly connected at one end to the inside of the housing and slidably extending through the opposite side of the housing, means slidably connecting said line to said member, and means for holding the line in its outermost position, the housing being provided with a normally closed clean-out opening adjacent the open end of said bag.

5. A welding fume exhauster comprising a portable housing provided in its opposite ends with inlet and outlet ports, a flexible hose outside the housing connected to said inlet, an exhaust fan carried by the housing adjacent its outlet for drawing welding fume into said hose, a plate mounted in the housing adjacent said inlet and provided with a plurality of openings, a plurality of long filter bags having their open ends mounted in said plate openings, a movable plate connected to the opposite ends of the bags, a spring connecting said plates for urging the movable plate toward the other one, means connected to the movable plate and operable from outside the housing for shaking the bags and for holding them extended, the housing being provided in front of said first-mentioned plate with a clean-out opening, and a removable closure for said opening.

6. A welding fume exhauster comprising a portable housing provided in its opposite ends with inlet and outlet ports, a flexible hose outside the housing connected to said inlet, an exhaust fan carried by the housing adjacent its outlet for drawing welding fume into said hose, a plate mounted in the housing adjacent said inlet and provided with a plurality of openings, spark arresting means mounted between said plate and inlet port, a plurality of long filter bags having their open ends mounted in said plate openings, a movable plate connected to the opposite ends of the bags, a spring connecting said plates for urging the movable plate toward the other one, means connected to the movable plate and operable from outside the housing for shaking the bags and for holding them extended, the housing being provided in front of said first-mentioned plate with a clean-out opening, and a removable closure for said opening.

7. A welding fume exhauster comprising a portable housing provided in its opposite ends with inlet and outlet ports, a flexible hose outside the housing connected to said inlet, an exhaust fan carried by the housing adjacent its outlet for drawing welding fume into said hose, a partition mounted in the housing adjacent its inlet and provided with a passage therethrough, said partition forming the rear wall of a separating chamber, a spark arresting screen in said passage, a filter bag behind said partition in the path of said fume, and means operable from outside the housing for shaking the bag, the housing being provided with a normally closed clean-out opening adjacent the open end of said bag.

8. A welding fume exhauster comprising a portable housing provided in its opposite ends with inlet and outlet ports, a flexible hose outside the housing connected to said inlet, an exhaust fan carried by the housing adjacent its outlet for drawing welding fume into said hose, a partition mounted in the housing adjacent its inlet and provided with a passage therethrough, a spark arresting screen in said passage, said partition forming the rear wall of a separating chamber, a baffle member mounted in said chamber directly behind said inlet port, a filter bag behind said partition in the path of said fume, and means operable from outside the housing for shaking the bag, the housing being provided with a normally closed clean-out opening adjacent the open end of said bag.

9. A welding fume exhauster comprising a portable housing provided in its opposite ends with inlet and outlet ports, a flexible hose outside the housing connected to said inlet, an exhaust fan carried by the housing adjacent its outlet for drawing welding fume into said hose, a filter bag in the housing in the path of said fume, said housing being provided with a separating chamber in front of the bag, an upright baffle member mounted in said chamber directly behind said inlet port, said member being curved laterally with its opposite sides extending forward, and means operable from outside the housing for shaking the bag, the housing being provided with normally closed clean-out openings adjacent the open end of said bag and in a wall of said chamber.

10. A welding fume exhauster comprising a portable horizontal cylinder, a hollow head closing the front end of the cylinder and provided with an inlet port, a flexible hose connected to said inlet and extending forward away from it, a cap closing the rear end of the cylinder and provided with an outlet port, an exhaust fan carried by the cap adjacent its outlet for drawing welding fume into said hose, a spark arrestor disposed in said head, means disposed between the spark arrestor and said inlet for separating large particles from the fume, a filter bag in the cylinder in the path of the fume with its open end adjacent said head, means operable from outside the cylinder for shaking the bag, said head being provided with clean-out openings, and removable closures for said openings.

LESLIE SILVERMAN.
FREDERICK J. VILES, Jr.